(12) United States Patent
Yim et al.

(10) Patent No.: US 8,718,376 B2
(45) Date of Patent: May 6, 2014

(54) APPARATUS AND METHOD FOR ENHANCING IMAGE IN PORTABLE TERMINAL

(75) Inventors: Sung-Jun Yim, Seoul (KR); Ja-Won Seo, Suwon-si (KR); Hae-Sun Lee, Seoul (KR); Jong-Hyub Lee, Gyeongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 509 days.

(21) Appl. No.: 13/014,301

(22) Filed: Jan. 26, 2011

(65) Prior Publication Data
US 2011/0182526 A1 Jul. 28, 2011

(30) Foreign Application Priority Data

Jan. 26, 2010 (KR) .................. 10-2010-0007157

(51) Int. Cl.
*G06K 9/46* (2006.01)
*G06K 9/66* (2006.01)

(52) U.S. Cl.
USPC .......................................... 382/190

(58) Field of Classification Search
None
See application file for complete search history.

(56) References Cited

U.S. PATENT DOCUMENTS

| | | | | |
|---|---|---|---|---|
| 5,630,037 | A * | 5/1997 | Schindler | 345/592 |
| 6,825,884 | B1 * | 11/2004 | Horiuchi | 348/362 |
| 7,881,551 | B2 | 2/2011 | Paik et al. | |
| 2006/0222255 | A1 | 10/2006 | Mizuno et al. | |
| 2007/0189627 | A1 | 8/2007 | Cohen et al. | |
| 2009/0153649 | A1 * | 6/2009 | Hirooka et al. | 348/47 |

FOREIGN PATENT DOCUMENTS

| | | |
|---|---|---|
| JP | 2006-279397 | 10/2006 |
| KR | 1020040032332 A | 4/2004 |
| KR | 1020050102805 | 10/2005 |
| KR | 1020060056304 | 5/2006 |
| KR | 1020070076243 A | 7/2007 |
| KR | 1020070118925 | 12/2007 |
| KR | 1020090091569 A | 8/2009 |

OTHER PUBLICATIONS

Alpha Blending Tutorial, by Toshihiro Horie.*

* cited by examiner

*Primary Examiner* — Vikkram Bali
(74) *Attorney, Agent, or Firm* — The Farrell Law Firm, P.C.

(57) ABSTRACT

Disclosed is an apparatus and a method for enhancing an image in a portable terminal. The apparatus includes an image processor for performing an Image Signal Processing (ISP) for an image received in a preview mode, an ROI processor for extracting an ROI from the image received from the image processor, enhancing an image of the extracted ROI, and synthesizing the image of the enhanced ROI with the image received from the image processor, and a controller for controlling the ROI processor to extract an ROI from an image received from the image processor, enhancing an image of the extracted ROI when a photographing is selected, synthesizing an image of the enhanced ROI with the image received from the image processor, and outputting an synthesized image.

16 Claims, 3 Drawing Sheets

APPARATUS AND METHOD FOR ENHANCING IMAGE IN PORTABLE TERMINAL

PRIORITY

This application claims priority under 35 U.S.C. §119(a) to a Korean Patent Application entitled "Apparatus and Method for Enhancing Image in Portable Terminal" filed in the Korean Intellectual Property Office on Jan. 26, 2010 and assigned Serial No. 10-2010-0007157, the entire disclosure of which is incorporated herein by reference.

BACKGROUND OF THE INVENTION

1. Field of the Invention

The present invention generally relates to an apparatus and a method for enhancing an image in a portable terminal, and more particularly to an apparatus and a method for enhancing an image in a portable terminal, which enhances an image according to a characteristic of a Region Of Interest (ROI), thereby obtaining the generally enhanced image.

2. Description of the Related Art

A general image enhancement method applies an identical image enhancement algorithm to a whole image. However, a single image includes multiple regions having various characteristics. Therefore, when an identical image enhancement algorithm is applied to the whole image, a problem is encountered in that the image cannot be enhanced according to the characteristic of each region.

For example, in an aspect of resolution and noise, when sharpening increases and denoise decreases in order to increase resolution, there is problem in that the resolution of a high-frequency region, such as grass or trees, increases, but the noise of a face of a person increases. Thus, if denoise is decreased, noise is increased, so the noise of the face of the person is increased.

SUMMARY OF THE INVENTION

Accordingly, the present invention has been made to solve the above-stated problems occurring in the prior art, and the present invention provides an apparatus and a method for enhancing an image in a portable terminal, which can enhance an image according to a characteristic of an Region of Interest (ROI), thereby obtaining the generally enhanced image.

In accordance with an aspect of the present invention, there is provided an apparatus for enhancing an image in a portable terminal, including an image processor for performing an Image Signal Processing (ISP) for an image received in a preview mode; a Region of Interest (ROI) processor for extracting an ROI from the image received from the image processor, enhancing an image of the extracted ROI, and synthesizing the image of the enhanced ROI with the image received from the image processor; and a controller to control the ROI processor to extract an ROI from an image received from the image processor, enhances an image of the extracted ROI when photographing is selected, synthesizes an image of the enhanced ROI with the image received from the image processor, and outputs a synthesized image.

In accordance with another aspect of the present invention, there is provided a method for enhancing an image in a portable terminal, the method including performing an ISP for an image received in a preview mode; extracting an ROI from the received image; applying a corresponding ISP method to an image of the extracted ROI and enhancing the image of the extracted ROI; and synthesizing the image of the enhanced ROI with the received image and displaying an synthesized image.

According to the apparatus and the method for enhancing the image in the portable terminal of the present invention, it is possible to obtain a generally enhanced picture and achieve a more enhanced effect in the higher resolution picture.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENT OF THE PRESENT INVENTION

Figure 1:
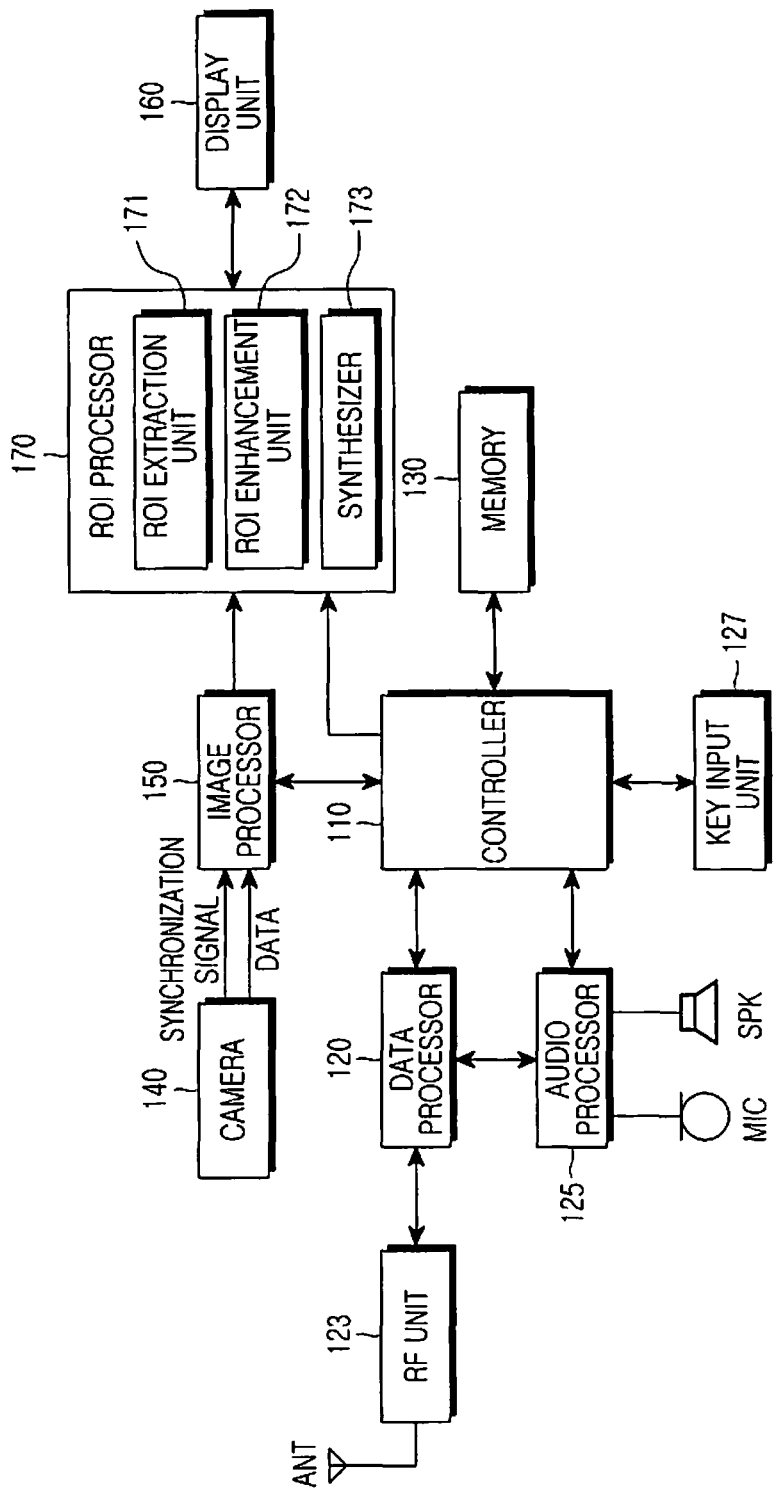
FIG. 1 is a block diagram illustrating a portable terminal according to an embodiment of the present invention.

Hereinafter, an embodiment of the present invention will be described with reference to the accompanying drawings. In the following description, the same elements will be designated by the same reference numerals although they are shown in different drawings.

FIG. 1 is a block diagram illustrating a portable terminal according to an embodiment of the present invention.

Referring to FIG. 1, RF unit 123 performs a wireless communication function of a portable terminal. RF unit 123 includes an RF transmitter for up-converting and amplifying a frequency of a transmitted signal and an RF receiver for low-noise amplifying a received signal and down-converting a frequency. Data processor 120 includes a transmitter for encoding and modifying the transmitted signal and a receiver for decoding and demodulating the received signal. That is, data processor 120 may include a modem and a codec. The codec includes a data codec for processing packet data, and the like, and an audio codec for processing an audio signal, such as voice. Audio processor 125 reproduces a received audio signal output from the audio codec of data processor 120 or transmits a transmitted audio signal generated in a microphone to the audio codec of the data processor 120.

Key input unit 127 includes keys for inputting numbers and character information and function keys for setting various functions.

Memory 130 can include a program memory and a data memory. The program memory stores programs for controlling the general operation of the portable terminal and control programs for applying a corresponding Image Signal Process (ISP) method to at least one Region of Interest (ROI) extracted from an image and enhancing an image including the ROI according to an embodiment of the present invention. Further, the data memory temporarily stores data generated during the execution of the programs.

Further, memory 130 stores a type of image characteristic of the ROI and corresponding ISP methods according to the type of image characteristic. The type of image characteristic of the ROI includes at least one of face/object recognition and a high-frequency/low-frequency region.

Controller 110 controls the generation operation of the portable terminal. According to an embodiment of the present invention, under the control of controller 110, image processor 150 performs the ISP for an image received from camera 140 in a preview mode and the ISP image is displayed on display unit 160.

Further, according to an embodiment of the present invention, under the control of controller 110, an ROI processor 170 extracts at least one ROI from the ISP image in the preview mode. When a photographing is selected, ROI processor 170 enhances the extracted ROI, synthesizes an image of the enhanced ROI with the ISP image, and outputs the synthesized image.

Camera 140 photographs image data, and includes a camera sensor for converting a photographed optical signal to an electric signal and a signal processor for converting an analog image signal photographed from the camera sensor to digital data. Here, it is assumed that the camera sensor is a Charge-Coupled Device (CCD) sensor or a Complementary Metal-Oxide-Semiconductor (CMOS) sensor and the signal processor can be implemented with a Digital Signal Processor (DSP). Further, the camera sensor can be integrally or separately formed with the signal processor.

Image processor 150 performs the ISP to display the image signal output from camera 140 on display unit 160. The ISP performs a function, such as gamma correction, interpolation, spatial change, image effect, image scale, Auto White Balance (AWB), Auto Exposure (AE), and Auto Focus (AF). Therefore, the image processor 150 processes the image signal output from camera 140 in a unit of a frame and outputs the frame image data in accordance with a characteristic and a size of the display unit 160. Image processor 150 includes an image codec, and compresses the frame image data displayed on display unit 160 in a preset scheme or restores the compressed frame image data to the original frame image data. The image codec includes the Joint Photographic Experts Group (JPEG) codec, the Moving Picture Experts Group (MPEG) 4 codec, the Wavelet codec, and the like. Assuming the image processor has an On Screen Display (OSD) function, it is possible to output OSD data in accordance with a size of the screen under the control of controller 110.

Further, image processor 150 performs the ISP for the image output from camera 140 in preview mode and outputs the ISP image to display unit 160 or ROI processor 170 according to the embodiment of the present invention.

ROI processor 170 applies the corresponding ISP method to the ROI extracted from the image received from image processor 150 and enhances the ROI image. Further, ROI processor 170 includes ROI extraction unit 171, ROI enhancement unit 182, and synthesizer 173.

ROI extraction unit 171 extracts at least one ROI from the image received from image processor 150 through an automatic/manual selection mode and extracts a corresponding ISP method according to the characteristic and the type of image characteristic of the extracted ROI.

ROI enhancement unit 172 applies the corresponding ISP method to the ROI extracted through ROI extraction unit 171 and enhances the image of the extracted ROI.

Synthesizer 173 synthesizes the image of the ROI enhanced through ROI enhancement unit 172 with the image received from the image processor 150.

When synthesizer 173 synthesizes the ROI enhanced through ROI enhancement unit 172 with the image received from image processor 150, synthesizer 173 sets a boundary area between the ROI extracted from the image received from image processor 150 and the ROI enhanced through ROI enhancement unit 172.

The boundary area is controlled depending on a difference of a brightness value between the ROI extracted from the image before the enhancement and the enhanced ROI. When the difference of the brightness value between the two ROIs is larger than a predetermined value, synthesizer 173 sets the length of the boundary area long such that the difference of the brightness cannot be recognized. If the length of the boundary area is increased when the difference of the brightness value between the two ROIs is larger than a predetermined value, the long boundary areas go through processing, so the processing speed of the long boundary areas is less than that of the boundary area with a shorter length. Thus, a user cannot recognize the difference of the brightness.

However, when the difference of the brightness value between the two ROIs is less than a predetermined value, synthesizer 173 makes a length of the boundary area short and reduce calculation. The length of the boundary area according to the embodiment of the present invention may be between 1/32 and 1/4 of the ROI.

Synthesizer 173 synthesizes the boundary area by Equation (1) below and the remainders by using a general synthesizing method.

$$y = \omega \cdot x_1 + (1-\omega) \cdot x_2 \qquad (1)$$

In Equation (1), a weight $\omega$ is a value within a range $0 < \omega < 1$, $x_1$ is a pixel value of the ROI extracted from the image before the enhancement, and $x_2$ is a pixel value of the enhanced ROI.

With regard to this, the weight $\omega$ decreases as it gets closer to a center of the image of the ROI. Therefore, as the weight $\omega$ gets closer to the center of the image of the ROI, it is possible to obtain the image of the ROI having a higher definition. Further, by setting the boundary area and synthesizing the boundary area by Equation (1), it is possible to prevent the generation of an artificial mark indicating the synthesis that may be generated in the synthesizing of the enhanced ROI with the image.

Display unit 160 displays an image signal output from image processor 150 on a screen and outputs user data output from controller 110. Display unit 160 can employ a Liquid Crystal Display (LCD), and in this case, display unit 160 can include an LCD controller, a memory for storing image data, an LCD display device, and the like. When the LCD is implemented by a touch screen, the LCD can function as an input unit. Further, display unit 160 displays an image including at least one enhanced ROI according to the embodiment of the present invention.

Figure 2:
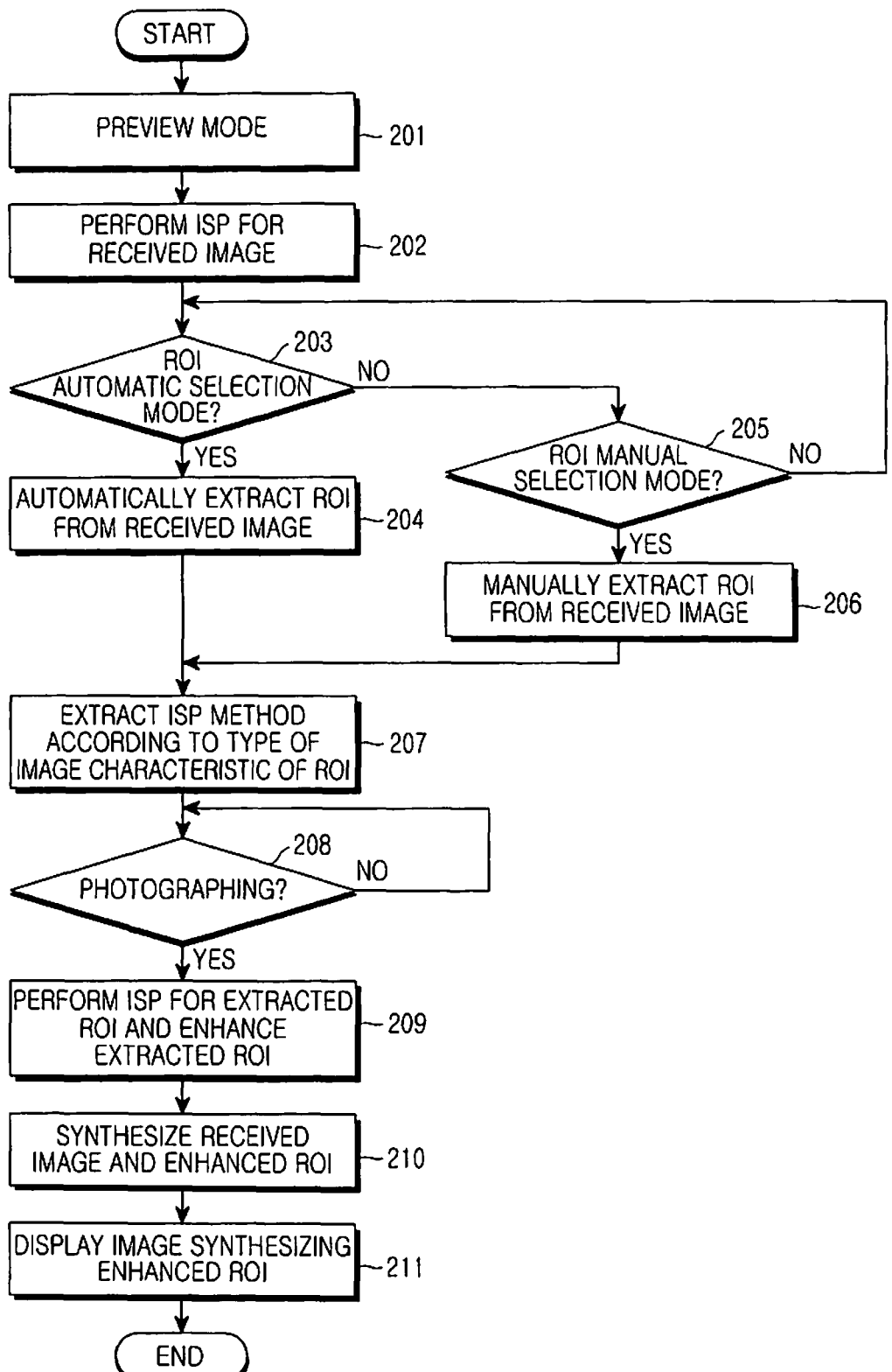
FIG. 2 is a flowchart illustrating a process of enhancing an image in a portable terminal according to an embodiment of the present invention.
Figure 3:
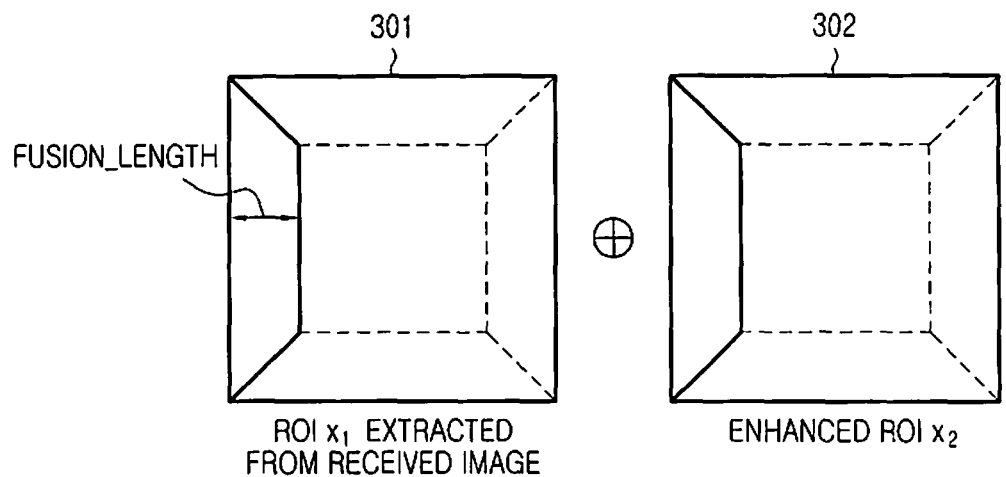
FIGS. 3 and 4 are diagrams illustrating the synthesizing process of FIG. 2.
Figure 4:
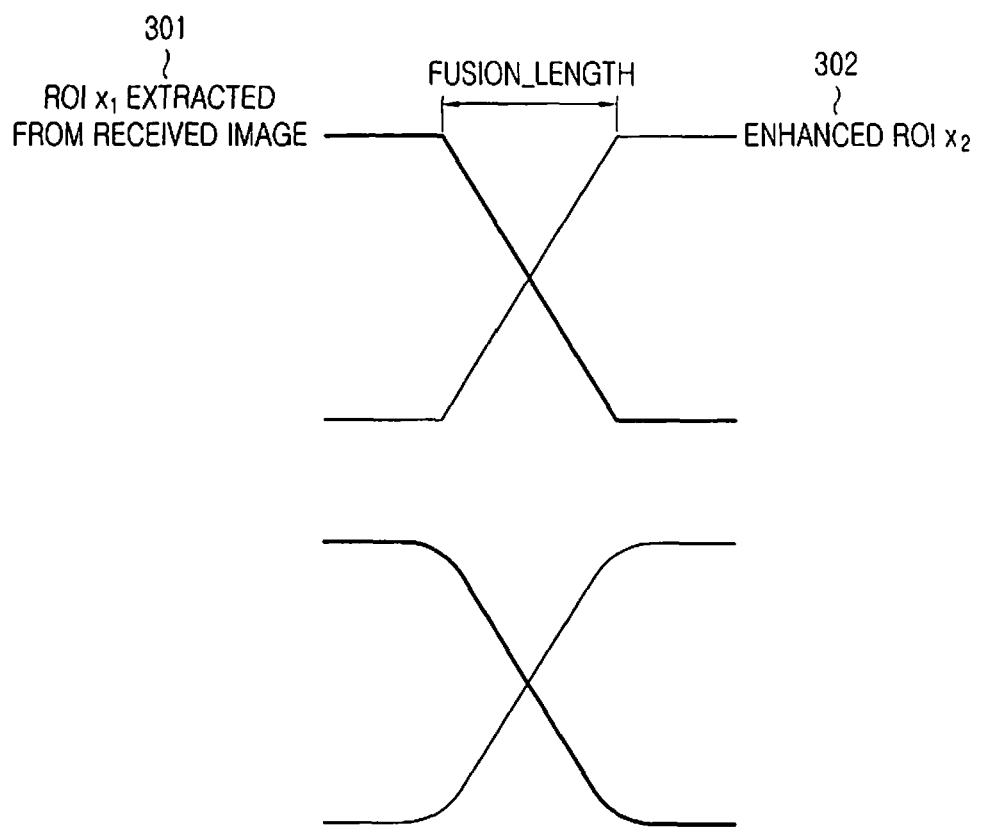

FIG. 2 is a flowchart illustrating a process of enhancement of an image in the portable terminal according to an embodiment of the present invention and FIGS. 3 and 4 are diagrams illustrating the synthesizing process of FIG. 2.

Hereinafter, the operation of the enhancement of the image in the portable terminal according to the embodiment of the present invention will be described with reference to FIGS. 2 to 4 in addition to FIG. 1 in detail.

Referring to FIG. 2, in step, 201, when an image is received through camera 140 in the preview mode of the portable terminal, the controller 110 detects the image. In step 202, the image processor 150 performs the ISP for the image and the display unit 160 displays the ISP image under the control of controller 110.

Controller 110 determines a selection mode of an ROI during the display of the ISP image on display unit 160. When the selection mode of the ROI is preset as an automatic selection mode, ROI processor 170 detects the setting of the automatic selection mode in step 203 and automatically extracts at least one ROI from the image under the control of the controller in step 204.

In step 204, ROI extraction unit 171 of the ROI processor 170 automatically extracts at least one ROI corresponding to a type of image characteristic (i.e., face/object recognition or a high/low frequency area) from the received image.

However, when a manual selection mode is selected by a user during the display of the ISP image on display unit 160, ROI processor 170 detects the selection of the manual selection mode in step 205 and manually extracts at least one ROI from the image in step 206.

In step 206, when the type of image characteristic of the ROI is displayed and the type of image characteristic is selected by the user, ROI extraction unit 171 extracts an ROI corresponding to the type of image characteristic selected by the user from the image under the control of controller 110. Otherwise, in step 206, the user can designate the ROI from the image displayed on display unit 160 by touching display unit 160 or inputting data through input unit 127.

When at least one ROI is extracted in step 204 or 206, ROI extraction unit 171 extracts an ISP method corresponding to the type of image characteristic of the extracted ROI from memory 130 in step 207.

When photographing is selected during the process, controller 110 detects the selection of the photographing in step 208, and ROI enhancement unit 172 enhances the extracted ROI under the control of controller 110 in step 209.

The ROI enhancement unit 172 applies the corresponding ISP method to the extracted ROI and enhances the extracted ROI in step 209.

For example, when the type of image characteristic of the extracted ROI is the face/object recognition, ROI enhancement unit 172 applies the ISP method, which enhances a quality of the face/object, to the extracted ROI.

Otherwise, when the type of image characteristic of the extracted ROI is the high/low frequency area, ROI enhancement unit 172 compares a frequency value of the corresponding ROI region and a predetermined frequency value and applies a corresponding ISP method, which controls the sharpening of the definition and the denoise for the noise, to the extracted ROI. When the frequency value of the corresponding ROI region is equal to or larger than the predetermined frequency value, ROI enhancement unit 172 increases the sharpening and decreases the denoise.

When the frequency value of the corresponding ROI region is less than the predetermined frequency value, ROI enhancement unit 172 decreases the sharpening and increases the denoise.

When the enhancement of the image of the ROI is completed in step 209, synthesizer 173 synthesizes the image received from image processor 150 and the enhanced ROI in step 210 under the control of controller 110 in step 210.

In step 210, in order to synthesize the image extracted from the image and the enhanced ROI, synthesizer 173 sets a boundary area between the ROI extracted from the image before the enhancement and the enhanced ROI.

The boundary area is set in order to prevent the artifact generated when the two ROIs are synthesized. As illustrated in FIG. 3, the boundary area has a predetermined length Fusion Length from upper/lower/left/right outermost portions toward the center of the two ROIs $x_1$ 301 and $x_2$ 302.

The boundary area is controlled according to a difference of the brightness values between the ROI $x_1$ 301 extracted from the image before the enhancement and the enhanced ROI $x_2$ 303. The difference of the brightness value between the two ROIs is larger than a predetermined value, synthesizer 173 makes a length of the boundary area long such that the difference of the brightness cannot be recognized. However, when the difference of the brightness value between the two ROIs is less than a predetermined value, synthesizer 173 makes a length of the boundary area short and decreases a quantity of calculation. When the length Funsion_Length of the boundary area according to the embodiment of the present invention may be between $\frac{1}{32}$ and $\frac{1}{4}$ of the ROI.

Synthesizer 173 synthesizes the boundary area by Equation (1) below and the remainders by using a general synthesizing method.

$$y = \omega \cdot x_1 + (1-\omega) \cdot x_2 \qquad (1)$$

In Equation (1), a weight $\omega$ is a value within a range $0<\omega<1$, $x_1$ is a pixel value of the ROI extracted from the image, and $x_2$ is a pixel value of the enhanced ROI.

As described above, synthesizer 173 processes the images of the two ROIs with the different weights $\omega$, wherein the weight $\omega$ decreases as it gets closer to the center of the image of the ROI, so that it is possible to obtain an image of the ROI, the definition of which becomes higher as it gets closer to the center of the image of the ROI. The change of the weights $\omega$ can be simply defined by a linear expression or a polynomial expression of the second or higher degree.

FIG. 4 illustrates a case in which the artificial mark indicating the synthesis is not generated when only the boundary area is synthesized by Equation (1).

When the enhanced ROI is synthesized with the image in step 210, the control unit 110 displays the synthesized image including the enhanced ROI on the display unit 160 under the control of the controller 110 in step 211.

While the present invention has been shown and described with reference to certain embodiments, such as the portable terminal, and drawings thereof, it will be understood by those skilled in the art that various changes in form and details may be made therein without departing from the spirit and scope of the invention as defined by the appended claims.

What is claimed is:

1. An apparatus for enhancing an image in a portable terminal, comprising:
   an image processor for performing an Image Signal Processing (ISP) for an image received in a preview mode;
   a Region of Interest (ROI) processor for extracting an ROI from the image received from the image processor, extracting a corresponding ISP method according to a type of image characteristic of the extracted ROI, applying the corresponding ISP method to an image of the extracted ROI and enhancing an image of the extracted ROI, and synthesizing the image of the enhanced ROI with the image received from the image processor; and
   a controller for controlling the ROI processor to extract the ROI from the image received from the image processor, enhance the image of the extracted ROI when a photographing is selected, synthesize the enhanced image of the ROI with the image received from the image processor, and for outputting the synthesized image.

2. The apparatus of claim 1, wherein the image processor comprises the ROI processor.

3. The apparatus of claim 1, wherein the ROI processor comprises:
   an ROI extraction unit for extracting an ROI from the image received from the image processor;
   an ROI enhancement unit for applying the corresponding ISP method to the image of the extracted ROI and enhancing the image of the extracted ROI; and
   a synthesizer for synthesizing the image of the extracted ROI with the image received from the image processor.

4. The apparatus of claim 3, wherein the type of image characteristic of the extracted ROI comprises at least one of face/object recognition and a high/low frequency area.

5. The apparatus of claim 3, wherein the ROI extraction unit automatically extracts at least one ROI corresponding to the type of image characteristic of the extracted ROI according to an ROI automatic selection mode, and the ROI extraction unit extracts at least one ROI selected by a user according to an ROI manual selection mode.

6. The apparatus of claim 3, wherein the synthesizer sets a boundary area between the ROI extracted from the received image and the enhanced ROI and synthesizes the boundary area by, $$y = \omega \cdot x_1 + (1-\omega) \cdot x_2,$$

in which a weight $\omega$ is a value within a range $0 \leq \omega \leq 1$, $x_1$ is a pixel value of the ROI extracted from the image, and $x_2$ is a pixel value of the enhanced ROI.

7. The apparatus of claim 6, wherein the weight $\omega$ decreases as the pixel gets closer to a center of the ROI.

8. The apparatus of claim 6, wherein the boundary area is controlled according to a difference of a brightness value between the ROI extracted from the image and the enhanced ROI.

9. The apparatus of claim 8, wherein the boundary area has a length between 1/32 and 1/4 of the ROI.

10. A method for enhancing an image in a portable terminal, the method comprising:

performing an Image Signal Processing (ISP) for an image received in a preview mode;

extracting an ROI from the received image;

extracting a corresponding ISP method according to the type of image characteristic of the extracted ROI;

applying the corresponding ISP method to an image of the extracted ROI and enhancing the image of the extracted ROI; and synthesizing the enhanced image of the ROI with the received image and displaying an synthesized image.

11. The method of claim 10, wherein the step of extracting the ROI comprises:

when an Region of Interest (ROI) automatic selection mode is selected, automatically extracting at least one ROI corresponding to a type of image characteristic from the received image; and when an ROI manual selection mode is selected by a user, extracting an ROI corresponding to a type of image characteristic selected by the user from the received image.

12. The method of claim 11, wherein the type of image characteristic of the extracted ROI comprises a face/object recognition or a high/low frequency area.

13. The method of claim 10, wherein synthesizing the image and displaying the synthesized image comprises:

setting a boundary area between the ROI extracted from the received image and the enhanced ROI; and synthesizing the boundary area by, $$y = \omega \cdot x_1 + (1-\omega) \cdot x_2,$$

in which a weight $\omega$ is a value within a range $0 < \omega < 1$, $x_1$ is a pixel value of the ROI extracted from the received image, and $x_2$ is a pixel value of the enhanced ROI.

14. The method of claim 13, wherein the weight $\omega$ decreases as the pixel gets closer to a center of the ROI.

15. The method of claim 13, wherein the boundary area is controlled depending on a difference of a brightness value between the ROI extracted from the received image and the enhanced ROI.

16. The method of claim 15, wherein the boundary area has a length between 1/32 and 1/4 of the ROI.

* * * * *